May 2, 1967  M. HOFFER ETAL  3,316,594
METHOD AND APPARATUS FOR MAKING CONTAINERS OF
THERMOFORMABLE MATERIAL
Original Filed Sept. 28, 1962  3 Sheets-Sheet 3
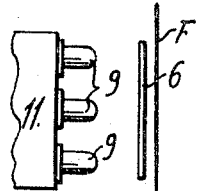
Fig. 4
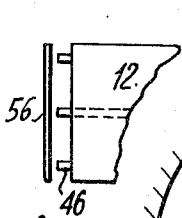
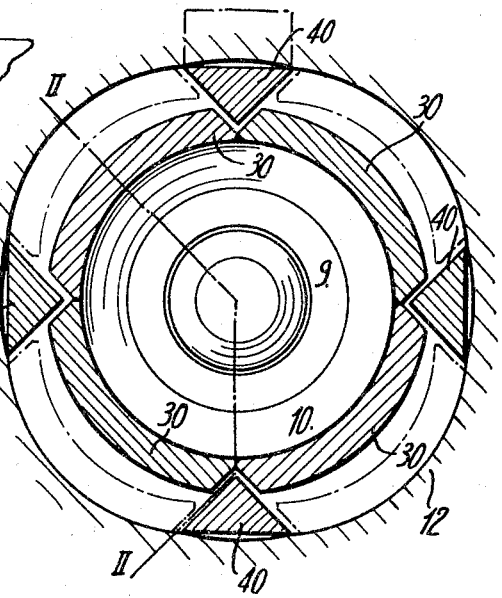
Fig. 3
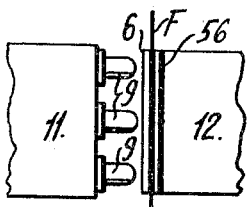
Fig. 5
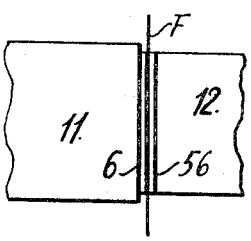
Fig. 6
Fig. 7
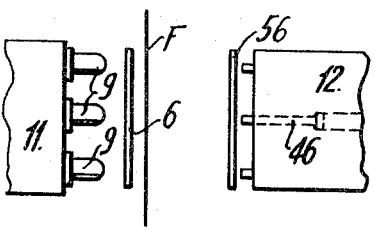
Fig. 8
INVENTORS
MAURICE HOFFER
ANDRE ULDRY
ERNEST ACKERMANN
JEAN-JACQUES R. DE BELLET
BY Irwin J. Thompson
ATTY.

United States Patent Office 3,316,594
Patented May 2, 1967

3,316,594
METHOD AND APPARATUS FOR MAKING CONTAINERS OF THERMOFORMABLE MATERIAL
Maurice Hoffer, Geneva, André Uldry, Chene-Bourg, Geneva, Ernest Ackermann, Carouge, Geneva, and Jean-Jacques Roissard De Bellet, Petit-Lancy, Geneva, Switzerland, assignors, by mesne assignments, to Monsanto Company, St. Louis, Mo., a corporation of Delaware
Original application Sept. 28, 1962, Ser. No. 226,834. Divided and this application Jan. 22, 1964, Ser. No. 340,857
Claims priority, application Switzerland, Oct. 9, 1961, 11,688/61
(Filed under Rule 47(a) and 35 U.S.C. 116)
8 Claims. (Cl. 18—19)

This application is a division of copending application Ser. No. 226,834, filed Sept. 28, 1962.

The present invention has for its object an installation comprising a thermoforming apparatus provided with a positioning device of the sheet of thermoformable plastic material, a heating device of at least a part of said sheet of plastic material, at least one die and at least one punch cooperating with said die located on either side of said sheet of plastic material, in which the die and the punch comprise each an injection device for a gaseous fluid in order that at least during a part of the forming cycle of a container the plastic material is confined between two gaseous cushions, and which comprises a control device controlling, among others, the speeds and the amplitudes of the relative displacements of the punch and of the die with respect to the sheet of plastic material, according to a function depending of the shape of the container to be formed and of the composition of the plastic material used, as well as the feeding with gaseous fluid of the injection devices.

The attached drawing illustrates schematically and by way of example one embodiment of the described installation.

FIG. 3 is a cross section of the die according to line III—III of FIG. 2.

FIGS. 4 to 8 show different relative positions of the punches and the dies of an installation during a forming cycle of containers.

Figure 1:
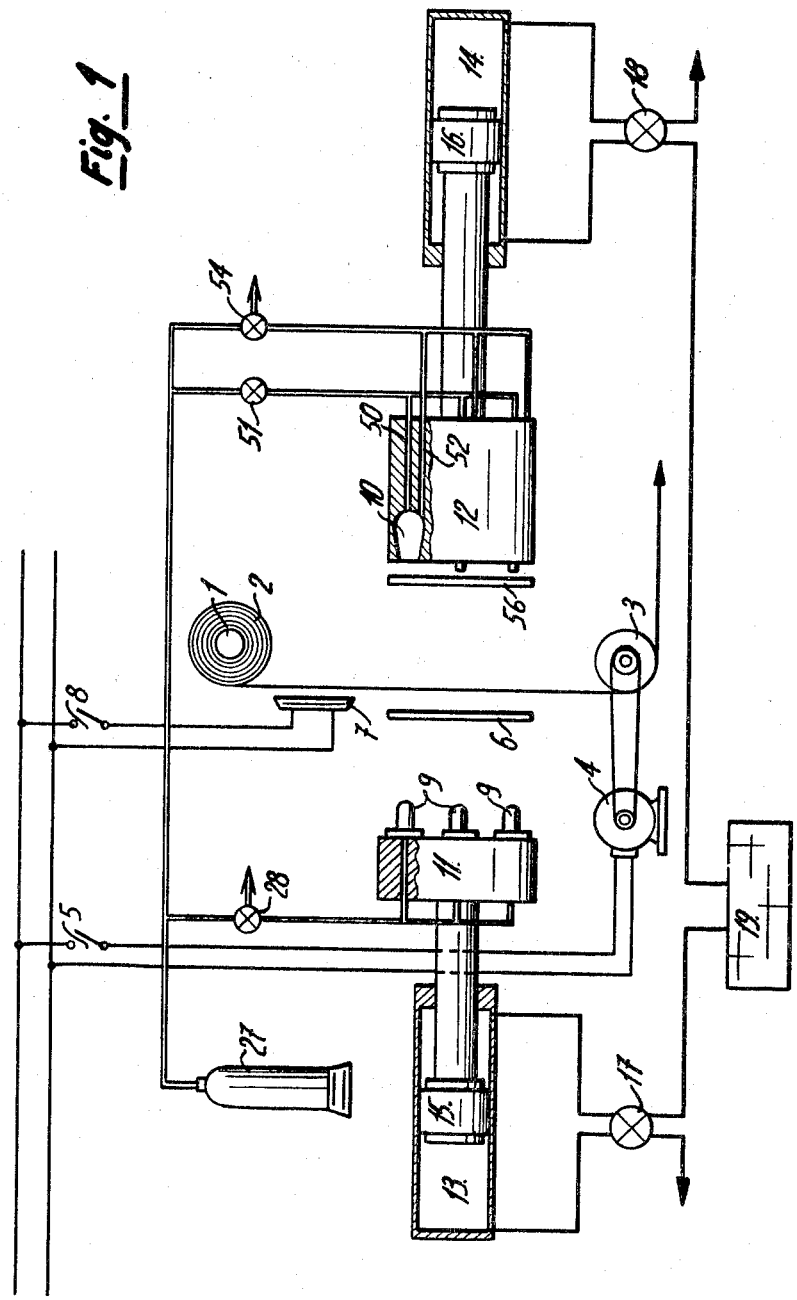
FIG. 1 is a scheme indicating the main electro-mechanico-pneumatical linkages existing between the different parts of the installation.

The method of manufacturing containers, having thin walls, of thermoplastic material according to the invention comprises rendering malleable or formable a sheet of thermoplastic plastic material by raising its temperature then locally mechanically deforming this malleable sheet by means of a punch displaced with respect to a die the cavity of which presents the shape of a finished container. Further, during at least a part of the relative displacement of the punch with respect to the die, the plastic material is stretched between two gaseous cushions until a container having dimensions approximating those of the finished container is obtained. This particular stretching makes it possible to obtain practically constant wall thicknesses of the container. In fact, no friction nor local hardening of the plastic material due to a local loss of heat happens, the plastic material being deformed between two gaseous cushions. The nature of the gaseous fluid used for these gaseous cushions is dictated particularly by the plastic material used. However in most applications, there will be used compressed air the pressure and the temperature of which will be determined, among other factors, as a function of the shape of the finished container and of the plastic material used.

Then, the container thus formed having dimensions near those of the desired finished container, only the inner gaseous cushion is maintained in order to apply the plastic material against the walls of the die and thus give to the container its definitive shape.

At least, to terminate the operation of a manufacturing cycle of a container, after withdrawal of the punch, the formed container is ejected out of the die through the aperture which receives said punch.

If desired to manufacture containers having reversed frusto-conical shapes or having countersunk portions, it is necessary to provide, before the ejection of the formed container, for the radial expansion of the die in order to enable the axial ejection of the finished container.

This manufacturing method may also comprise a further intermediary operation which can be effectuated at any stage of the manufacturing cycle during which the punch is introduced in the die, that is the end of the preforming, during the forming or after the definitive forming. This supplementary operation comprises in separating the manufactured container or at least the portion of plastic material used for the manufacture of the container, from the thermoplastic sheet of plastic material.

This separation of the formed container from the sheet is very important since it enables a rationalized manufacture without resettings of the containers.

For the automatic and continuous manufacture of containers there is provided between each cycle of manufacture of containers the renewal of the sheet of plastic material. This may be realized in a very simple manner when the sheet of plastic material is in the form of a strip. It suffices then in fact to drive this strip of plastic material between each manufacturing cycle of containers so that a non used part of it is located between the punch and the die.

This manufacturing method of container has the following main advantages with respect to the now existing manufacturing methods:

(1) Obtention of containers having thin walls and presenting a constant thickness, with the ability to reach one tenth of millimeter.

(2) Obtention of containers presenting rigorously cylindrical shapes, reversed frusto-conical shapes or countersunk portions of any shape, inscriptions, imprints, etc.

(3) Obtention of finished containers without resettings, the separation of the formed containers from the sheet of plastic material being effectuated during the forming cycle of the container.

(4) Realization of a very high stretching rate of the sheet of plastic material. In fact, due to the constancy of the thickness of the walls of the containers, it is possible to use as rationally as possible, the mass of plastic material available for a container.

(5) Due to the fact that the plastic material is stretched between two gaseous cushions, it is not necessary to heat the die. It is even good that these dies be cold in order to avoid their dirtying and to increase the cooling of the finished container in order to reduce the time necessary for a forming cycle.

The present invention has for its object an installation to carry out the described method. This installation comprises a thermoforming apparatus having a positioning device for the sheet of thermoformable material and a heating device for at least one part of this sheet of plastic material. These positioning and heating devices for the sheet of plastic material are well known devices and are illustrated very schematically at FIG. 1.

The positioning device comprises in the example shown on the one hand a step by step driving device and on the other hand, a fixing gate for the said sheet. The driving device has a support 1 intended to receive a roll 2 of sheet plastic material as well as driving means 3 driving the said sheet and driven in rotation by means of an electric motor 4 the setting in operation of which is manually controlled by means of a switch 5. Known means are provided to stretch the plastic material between the roller 2 and the driving means 3.

The fixing gate 6 makes it possible to maintain the sheet of plastic material F in a determined position during the forming of at least certain parts of it.

The heating device for the sheet F of plastic material comprises heating bodies 7, for example infra-red heating bodies located along the said sheet F, the setting in operation of which is controlled by a switch 8.

This installation comprises further, like the known thermoforming installations, at least one punch 9 and at least one die 10 co-operating the one with the other and located on either side of the sheet F of plastic material. In the example shown these punches 9 and these dies 10 are carried by male 11 and female 12 mould-carrying blocks respectively. In the example shown, these male 11 and female 12 mould-carrying blocks are slidingly mounted with respect to the frame of the thermoforming installation in a horizontal plan.

Each of these mould-carrying blocks 11, 12 is provided with an actuating device making it possible to displace it from an inactive withdrawn position to a forward position for which the punches 9 are engaged in the corresponding dies 10. These actuating devices in the example shown comprise hydraulic double effect jacks 13, 14 respectively, the pistons 15, 16 of which are respectively fast with the mould-carrying blocks 11, 12. These jacks 13, 14 are connected through the intermediary of valves 17, 18 respectively alternatively to a container 19 of fluid under pressure and to the discharge.

Due to these valves 17, 18 it is not only possible to determine the direction of the displacements of the corresponding mould-carrying blocks but as well to control the speed of displacement by acting on the flow rate of the fluid under pressure.

This installation differentiates from the known existing installations by the fact that each punch 9 and each die 10 is provided with an injection device for a gaseous fluid and that it comprises further a control device controlling, among other things, the amplitudes and the speeds of the relative displacements of the male and female mould-carrying blocks with respect to the sheet of plastic material according to a function depending on the shape of the finished container and the composition of the plastic material used as well as the feeding with gaseous fluid of the injection devices of the punches and the dies.

Figure 2:
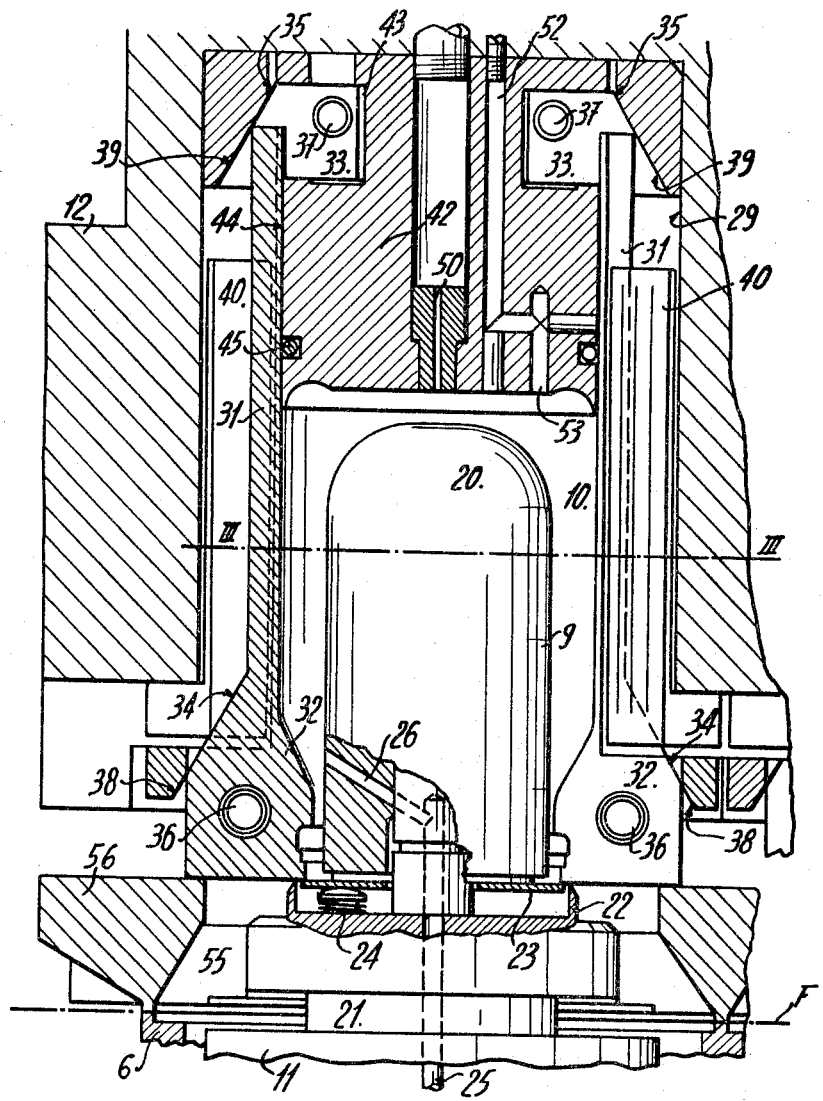
FIG. 2 shows in section according to line II—II of FIG. 3, one punch and one die.

FIG. 2 shows one of the punches 9 and one of the dies 10 carried by the corresponding mould-carrying blocks 11, 12. Each punch 9 comprises a head 20 of a material ensuring a low and homogeneous heat dissipation in order not to lower locally the temperature of the plastic material coming in contact with it. Material such as wood or epoxyline or polyester resins for example may be used without inconvenience. This head 20 is axially displaceable with respect to a support 21 fast with the mould-carrying block 11. The stroke of the axial displacement of the head 20 depends in particular on the shape of the container to be formed and on the thickness of the sheet of plastic material out of which the container is manufactured.

Each punch comprises further a cutting device comprising a circular knife 22 fixed on the support 21 the edge of which is located in a plan perpendicular to the axis of the punch. A washer 23 axially displaceable with respect to the support 21 against the resilient action of spring means 24, in the example shown, tending to maintain this washer against the rear frontal face of the head 20, is located normally in a plane perpendicular to the axis of the punch located before that in which the edge of the knife 22 is located. This washer serves to maintain the plastic material in position with respect to the frontal face of the die during the forming operation.

Each punch is further provided with a gaseous fluid injection device comprising a feeding duct 25 co-axial with the support 21 giving access to one or several nozzles 26 located at the base of the head 20 of the punch the dimensions, the number and the disposition of these nozzles 26 are chosen in order to ensure a homogeneous distribution of the gaseous fluid around the punch. The feeding duct 25 is connected to a source of gaseous fluid under pressure 27 by means of a valve 28 making it possible to control the flow of the said gaseous fluid.

Each die 10 is disposed inside a bore 29 of the female mould-carrying block 12 centered on the corresponding punch 9.

In the example shown, each die is formed by four parts 30 having in transverse cross-section the general shape of a ring sector. Each part 30 comprises a middle cylindrical portion 31 of relatively small thickness and fore and rear end portions 32 and 33 respectively of greater thickness and comprising a conical outside surface 34, 35 respectively. These conical surfaces 34, 35 are maintained, by means of springs 36, 37 disposed respectively between the portions 32 and 33 of adjacent parts 30 and tending to separate parts 30 from each other, and to urge portions 32 and 33 into contact with conical surfaces 38, 39 respectively fast with the mould-carrying block 12. Guides 40 fast with the mould-carrying block 12 maintain the parts 30 in their desired radial positions.

The die thus provided is able to expand radially, the parts 30 being able to pass from their service position, illustrated in full lines at FIG. 3 where they define a cavity the shape of which corresponds to that desired to impart to a container to an extracting position, illustrated in dotted lines in FIG. 3. This radial expansion of the die is obtained by an axial displacement of the parts 30 with respect to the mould-carrying block 12. In the opened, rest position, the die is maintained in its extraction, expanded position, under the action of the springs 36, 37.

Each die 10 comprises further a bottom 42 of general cylindrical shape and having an annular groove 43 in which the rear portions 33 of the parts 30 are engaged rendering thus this bottom 42 axially fast with the said parts 30.

In the closed, service position of the die, the rear extremity of the middle portions 31 of the parts 30 is applied against the cylindrical peripheral surface 44 of the said bottom 42. The tightness between these parts 30 and the bottom 42 is ensured for example by a seal 45. Each die comprises further an ejection device which in the embodiment shown is provided by a duct 50 connected through the intermediary of a valve 51 to a source of gaseous fluid under pressure.

Further each die comprises a gaseous fluid injection device comprising a feeding duct 52 provided in the bottom 42 and connected through the intermediary of a valve 54 to the gaseous fluid source 27. This duct 52 feeds with gaseous fluid one or several nozzles 53 providing access to the cavity of the die. The number, the dimensions, and the disposition of these nozzles 53 are chosen in such a manner as to obtain a homogeneous distribution of the gaseous fluid along the walls of the cavity of the die.

The thermoplastic installation comprises further a closing plate 56 situated between the punches and the dies. This closure plate 56 is pierced with bores 55 enabling the punches to pass therethrough. During the feeding stroke of the female mould-carrying block 12 the frontal faces of the parts 30 of the die come in contact with one of the faces of the said closure plate provoking an axial displacement of these parts 30 with respect to the female mould-carrying block 12 causing in turn the die to be placed in its service position, that is to say the wedging of these parts 30 the one against the others and against the bottom 42 respectively in order to define the cavity the shape of which corresponds to that of the container which is to be manufactured.

The installation according to the invention comprises further at least a control device controlling, among other things, the amplitudes and the speeds of the relative displacements of the punches and of the dies with respect to the sheet of plastic material in accordance with a function depending on the shape of the container to be formed and of the composition of the plastic material used, as well as the feeding with gaseous fluid of the injection devices of the punches and of the dies.

In the example shown this control device is manual and comprises the valves 17, 18 making it possible to control the amplitudes and the speeds of the relative displacements of the male and female mould-carrying blocks 11 and 12 respectively with respect to the sheet of plastic material as well as the valves 28 and 54 controlling the feeding with gaseous fluid of the injection devices of the punches and of the dies.

At least, in the example shown, this control device comprises further the valve 51 controlling the ejection device and the electric switches 5 and 8 controlling respectively the driving of the sheet F of plastic material and the heating device for this sheet F.

It is to be noted that the installation does not comprise any heating device for the moulds in particular for the dies. In fact, the dies are used at low temperature, ambient temperature or even lower temperatures, near 0° C. to enable the rapid cooling of the formed container.

The operation of the installation described is the following:

At the beginning of the manufacturing cycle, that is to say in the rest position of the installation, the different devices of the installation are in the following positions or conditions:

The mould-carrying blocks 11 and 12 are maintained in withdrawn inactive position by means of the jacks 13 and 14 respectively the corresponding chambers of which are put under pressure by means of the valves 17 and 18 respectively.

The dies are in their opened position and the injection devices of the punches as well as of the dies have their valves 28 and 54 closed so that they are not fed with gaseous fluid.

The heating devices 7 and the driving device for the sheet F of plastic material are switched off, the electric switches 8 and 5 being opened.

However, in this rest condition of the installation, the sources of fluid under pressure 19 and 27 are pressurized.

From this rest condition of the installation, the following successive operations are necessary for the formation of containers of plastic material.

(1) The heating of the sheet of plastic material (FIG. 4):

The operator closes the switch 8 energizing the heating device. One portion of the sheet of plastic material is thus heated to a temperature such that it becomes malleable. This temperature is determined as a function of the plastic material used as well as of the shape of the container to be formed. When this temperature is reached, the operator opens again the switch 8 deenergizing the heating device.

(2) The driving of the sheet of plastic material (FIG. 5):

The operator closes the switch 5 energizing of the electric motor 4 and the roller 3 which moves the sheet F. As soon as the heated portion of the sheet F is located between the punches and the dies, the operator opens the switch 5 stopping the driving of the said sheet F.

(3) The driving of the female mould-carrying block 12:

The operator reverses, by means of the valve 18, the direction of flow of the driving fluid of the double acting jack 14, that causes the forwarding of the female mould-carrying block. The flow rate of the driving fluid is adjusted in order that feeding can be done at a high speed.

During their displacement the frontal faces of the parts 30 of the dies come in contact with the closure plate 56 that effects the closing of the dies as described hereabove. At the end of the forwarding stroke of the female mould-carrying block 12 this closure plate 56 is in contact with the sheet of plastic material F.

(4) The forward stroke of the male mould-carrying block (FIG. 6):

Before the female mould-carrying block 12 reaches the end of its forward stroke, the operator reverses, by means of the valve 17, the direction of flow of the driving fluid of the double acting jack 13 that effects the forward stroke of the male mould-carrying block 11. The operator always by means of the valve 17 controls the rate of flow of the driving fluid so that the forwarding of the male mould-carrying block takes place initially at a low speed then accelerate to reach a high speed at the end of the stroke.

(5) The forming of the container (FIG. 7):

(a) During its forward stroke, the male mould-carrying block 11 causes the introduction of the punch 9 inside the die 10. However, before it is introduced in the die, the punch comes into contact with the sheet of plastic material F and deforms it mechanically locally.

(b) Once this mechanical local deformation of the sheet F reaches an axial amplitude which may be comprised between a few millimeters and a few centimeters, the operator opens the valve 54 causing the feeding of gaseous fluid to the injection device for introducing gaseous fluid into the die. The operator controls through the valve 54 the flow rate of this gaseous fluid at all times so that a gaseous cushion is formed between the plastic material and the walls of the cavity of the die. During this phase of the forming, the plastic material is stretched between the punch and an outside gaseous cushion.

(c) When the punch is introduced a certain distance, for example half of its length into the die, the operator opens the valve 28 causing the feeding of gaseous fluid to the injection device of the punch. Always through the valve 28, the operator controls the flow rate of the gaseous fluid so that a gaseous cushion is created between the punch and the plastic material which has a higher pressure than the outer gaseous cushion created between the walls of the die and the plastic material. During this phase of the forming the plastic material is stretched between two gaseous cushions an outer one and an inner one.

(d) When the punch is completely engaged in the die, the operator reverses the valve 54 and thus connects the gaseous fluid injection device of the die to discharge. The plastic material is then applied against the walls of the die by means of the pressure of the inner gaseous cushion produced by the injection device of the punch that terminates the forming of the container. A time is allowed to elapse enabling the cooling of the formed container. This cooling is very rapid since the die is cold. The heat of the plastic material is very rapidly dissipated.

(6) The separation of the formed container from the sheet of plastic material:

When the punch is introduced in the die, the washer 23 is axially pushed back abutting against the frontal face of this die, thus uncovering the edge of the circular knife 22 which comes in contact with the frontal face of the die. The formed container is thus separated from the sheet of plastic material. During this time, the sealing of the die is ensured by the washer 23.

(7) The withdrawal of the male and female mould-carrying blocks (FIG. 8):

Once the forming is terminated, the operator closes the valve 28 interrupting the feeding of fluid to the injection device of the punch; then he reverses, by means of the valves 17 and 18, the feeding with driving fluid of the double acting jacks 13 and 14 effecting the withdrawal of the mould-carrying blocks 11 and 12. Always by means of the valves 17, 18 the operator controls the flow rate of the driving fluid so that the withdrawal of the mould-carrying blocks 11, 12 is effectuated at high speed.

(8) The ejection of the formed container:

During the withdrawal of the female mould-carrying block, the closure plate 56 escapes the frontal faces of the parts 30 of the die which expands radially under the action of the springs 36, 37. This radial expansion of the die makes it possible to free the formed container even if it has important countersunk portions. When the female mould-carrying block 12 is at the end of its withdrawal stroke, the operator opens the valve 51 thus feeding the ejection device with fluid under pressure that effects the ejection of the formed container out of the die.

The manufacture cycle of a container is then terminated and a new cycle identical to the one just described may start.

It is evident that some of the operations described hereabove as being successive ones could overlap, at least partially, in the time in order to reduce the duration of the manufacturing cycle as far as it does not damage the quality of the formed containers. The described sequence of the operations could also be modified.

Further it has been indicated in the preceding that the control device of the installation is actuated manually but it is evident that it could be actuated automatically according to a pre-established program in a known manner as now currently used.

One embodiment of the thermoforming installation has been described by way of a non-limitative example but it goes without saying that numerous variations could be made without departing from the scope of the claimed protection.

Particularly the die could be in only one part and thus not expansible radially in the case where containers without countersunks would be formed.

Further the amplitudes and the speeds of the relative displacements between the punches and the corresponding dies with respect to the sheet of plastic material depend in particular on the plastic material used and on the shape of the containers formed.

The gaseous fluid used for the formation of the gaseous cushions between which the plastic material is stretched is generally air. However, according to the applications and the composition of the plastic material used, this gaseous fluid could be for example an inert gas or any other desired gaseous mixture.

Further it is evident that the constructions of the different devices described could be modified as far as their functions would be maintained.

In certain cases, particularly during the manufacturing of deep containers, it is advantageous to use a punch the head of which is telescopic that is to say able to be displaced axially against an elastic action.

The ejection device could be different for example mechanical or hydro-mechanical. This device could be constituted by one of the numerous known ejection devices.

A further variation of the installation could comprise a cooling device for the dies.

Tests conducted have shown that with the aid of the method and the installation described, it is possible to produce very easily containers having for example dimensions such as the following:

|  | Mm. |
|---|---|
| Diameter of the neck of the container | 41 |
| Diameter of the bottom of the container | 60 |
| Height of the container | 115 |
| Thickness of the walls of the container | 0.4 |

We claim:

1. In apparatus of the class described for forming articles such as containers and the like from a heated sheet of plastic material, a punch and die located one on either side of said sheet, respectively, means advancing said punch relatively to said sheet to engage and initially deform same, means effecting relative movement of said punch and die to introduce said punch into said die, gas flow control means operable in timed relation to movement of said punch in said die to introduce gaseous material under pressure into said die thus to apply the plastic material against said punch and to prevent same from contacting said die, gas flow control means operable in timed relation to movement of said punch in said die to introduce gaseous material between said punch and plastic material after said plastic material has been applied against said punch, and means relieving said first mentioned pressure at a preselected time in the excursions of said punch in said die thus to permit the gaseous material between said punch and plastic material to expand the latter against the wall of said die.

2. In apparatus of the class described for forming articles such as containers and the like from a heated sheet of plastic material, punch and die located one on either side of said sheet, respectively, for cooperation to form a desired shape from said sheet, clamping means delimiting an area of the sheet from which an article is to be formed, means advancing said punch relatively to said sheet to engage and mechanically draw same, means effecting relative movement of said punch and die to introduce said punch into said die, gas flow control means operable in timed relation to movement of said punch in said die to introduce gaseous material under pressure into said die thus to further draw the plastic material and apply same against said punch as well as to prevent same from contacting said die, gas flow control means operable in timed relation to movement of said punch in said die to introduce gaseous material between said punch and plastic material after the punch has engaged said sheet, and means relieving said first mentioned pressure at a preselected time in the excursion of said punch in said die thus to permit the gaseous material between said punch and plastic material to expand the latter against the wall of said die.

3. In apparatus of the class described for forming articles such as containers and the like from a sheet of plastic material, a punch having a head composed of a material ensuring a low and homogeneous heat dissipation and a die located one on either side of said sheet, respectively, for cooperation to form a desired shape from said sheet, means positioning a heated region of said sheet between said punch and die, means advancing said punch relatively to said sheet to engage and initially deform same, means effecting cooperative movement of said punch and die to introduce said punch into said die, gas flow control means operable in timed relation to movement of said punch in said die to introduce gaseous material under pressure into said die thus to apply the plastic material against said punch and to prevent same from contacting said die, gas flow control means operable in timed relation to movement of said punch in said die to introduce gaseous material between said punch and plastic material after said plastic material has been applied against said punch at a pressure higher than the pressure of said gaseous material in said die, and means relieving said first mentioned pressure at a preselected time in the excursion of said punch in said die thus to permit the gaseous material between said punch and plastic material to expand the latter against the wall of said die.

4. In apparatus of the class described for forming articles such as containers and the like from a sheet of plastic material, a punch member having a head composed of a material ensuring a low and homogeneous heat dissipation and a die member located one on either side of said sheet, respectively, for cooperation to form a desired shape from said sheet, means positioning a heated region of said sheet between said punch and die members, means advancing said punch member relatively to said sheet to engage and initially deform same, means effecting cooperative movement of said punch and die members to introduce said punch member into said die member, gas flow control means operable in timed relation to movement of said punch member in said die member to introduce gaseous material under pressure into said die member thus to apply the plastic material against said punch member and to prevent same from contacting said die, gas flow control means operable in timed relation to movement of said punch member in said die member to introduce gaseous material between said punch member and plastic material, means relieving said first mentioned pressure at a preselected time in the excursion of said punch member in said die member thus to permit the gaseous material between said punch member and plastic material to expand the latter against the wall of said die member, and cutting means carried by one of said members and cooperating with means associated with the other of said members to cut the plastic material within the die member from the sheet.

5. In apparatus of the class described for forming articles such as containers and the like from a sheet of plastic material, a punch and die located one on either side of said sheet, respectively, for cooperation to form a desired shape from said sheet, means positioning a heated region of said sheet between said punch and die, means advancing said punch relatively to said sheet to engage and initially deform same, means effecting cooperative movement of said punch and die to introduce said punch into said die, gas flow control means operable in timed relation to movement of said punch in said die to introduce gaseous material under pressure into said die thus to apply the plastic material against said punch and to prevent same from contacting said die, gas flow control means operable in timed relation to movement of said punch in said die to introduce gaseous material between said punch and plastic material, means relieving said first mentioned pressure at a preselected time in the excursion of said punch and said die thus to permit the gaseous material between said punch and plastic material to expand the latter against the wall of said die, said die being formed of a plurality of segments radially expansible relatively to one another, means urging said segments to expanded position, and means effective to shift said segments to contracted position upon said cooperative movement of said punch and die.

6. In apparatus of the class described for forming articles such as containers and the like from a sheet of plastic material, a punch and die located one on either side of said sheet, respectively, for cooperation to form a desired shape from said sheet, means positioning a heated region of said sheet between said punch and die, means advancing said punch relatively to said sheet to engage and initially deform same, means effecting cooperative movement of said punch and die to introduce said punch into said die, gas flow control means operable in timed relation to movement of said punch in said die to introduce gaseous material under pressure into said die thus to apply the plastic material against said punch and to prevent same from contacting said die, gas flow control means operable in timed relation to movement of said punch in said die to introduce gaseous material between said punch and plastic material, means relieving said first mentioned pressure at a preselected time in the excursion of said punch in said die thus to permit the gaseous material between said punch and plastic material to expand the latter against the wall of said die, said die being formed of a plurality of segments radially expansible relatively to one another, means ejecting the formed article from the die when same is in expanded condition, spring means urging said segments to expanded position, and means effective to shift said segments to contracted position against the force of said spring means upon said cooperative movement of said punch and die.

7. In apparatus of the class described for forming articles such as containers and the like from a sheet of plastic material, a heating device, means positioning a sheet of thermoformable plastic material relatively to said device for heating a region of said sheet to a moldable condition, a punch member and a die member located one on either side of said sheet, respectively, for cooperation to form a desired shape from said sheet, means advancing the heated region of said sheet into a position between said punch and die members, means advancing said punch member relatively to said sheet to engage and initially deform same, means effecting cooperative movement of said punch and die members to introduce said punch member into said die member, gas flow control means operable in timed relation to movement of said punch member in said die member to introduce gaseous material under pressure into said die member from the bottom thereof thus to apply the plastic material against said punch member and to prevent same from contacting said die, a passage-way adjacent the outer end of said punch member, gas flow control means operable in timed relation to movement of said punch member in said die member to introduce gaseous material through said passage-way between said punch member and plastic material at a pressure higher than the pressure of said gaseous material in said die member, means relieving said first mentioned pressure at a preselected time in the excursion of said punch in said die members thus to permit the gaseous material between said punch member and plastic material to expand the latter against the wall of said die member, cutting means carried by one of said members and cooperating with means associated with the other of said members when the punch member is within the die member to cut the plastic material within the die member from the sheet, said die being formed of a plurality of segments radially expansible relatively to one another, spring means urging said segments to expanded position, and means effective to shift said segments to contracted position against the force of said spring means upon said cooperative movement of said punch and die.

8. In apparatus of the class described for forming articles such as containers and the like from a sheet of plastic material, a heating device, means positioning a sheet of thermoformable plastic material relatively to said device for heating a region of said sheet to a moldable condition, a punch having a head composed of a material ensuring a low and homogeneous heat dissipation and a die located one on either side of said sheet, respectively, for cooperation to form a desired shape from said sheet, means advancing the heated region of said sheet into a position between said punch and die, means advancing said punch relatively to said sheet to engage and initially deform same, means effecting cooperative movement of said punch and die to introduce said punch into said die, gas flow control means operable in timed relation to movement of said punch in said die to introduce gaseous material under pressure into said die thus to apply the plastic material against said punch and to prevent same from contacting said die, gas flow control means operable in timed relation to movement of said punch in said die to introduce gaseous material between said punch and plastic material at a pressure higher than the pressure of said gaseous material in said die, and means relieving said first mentioned pressure at a preselected time in the excursion of said punch in said die thus to permit the gaseous material between said punch and plastic material to expand the latter against the wall of said die.

References Cited by the Examiner
UNITED STATES PATENTS

| | | | |
|---|---|---|---|
| 2,891,280 | 6/1959 | Politis | 18—19 X |
| 2,973,558 | 3/1961 | Stratton | 264—89 |
| 2,985,914 | 5/1961 | Miller | 18—19 |
| 3,081,491 | 3/1963 | Black | 18—19 |
| 3,159,693 | 12/1964 | Phymale | 264—93 X |
| 3,172,159 | 3/1965 | Edwards | 18—19 |

WILLIAM J. STEPHENSON, *Primary Examiner.*

J. SPENCER OVERHOLSER, *Examiner.*

L. S. SQUIRES, *Assistant Examiner.*